US010477062B2

(12) United States Patent
Sunagawa et al.

(10) Patent No.: US 10,477,062 B2
(45) Date of Patent: Nov. 12, 2019

(54) IMAGE FORMING APPARATUS FOR MANAGING SUBSTANTIALLY SIMULTANEOUS IMAGE PROCESSING REQUESTS

(71) Applicants: Yuki Sunagawa, Kanagawa (JP); Kazuhiro Ikeda, Kanagawa (JP)

(72) Inventors: Yuki Sunagawa, Kanagawa (JP); Kazuhiro Ikeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/059,555

(22) Filed: Aug. 9, 2018

(65) Prior Publication Data
US 2019/0052771 A1 Feb. 14, 2019

(30) Foreign Application Priority Data

Aug. 10, 2017 (JP) .................. 2017-155914
Jul. 30, 2018 (JP) .................. 2018-142516

(51) Int. Cl.
H04N 1/327 (2006.01)
H04N 1/00 (2006.01)
H04N 1/44 (2006.01)

(52) U.S. Cl.
CPC ....... H04N 1/32776 (2013.01); H04N 1/0048 (2013.01); H04N 1/00228 (2013.01);
(Continued)

(58) Field of Classification Search
None
See application file for complete search history.

(56) References Cited

U.S. PATENT DOCUMENTS

2004/0174560 A1* 9/2004 Shima .................. G06F 3/1206
358/1.15
2006/0082827 A1* 4/2006 Lee ....................... G06F 3/1204
358/1.15
(Continued)

FOREIGN PATENT DOCUMENTS

CN   104580798 A   4/2015
CN   106303131 A   1/2017
(Continued)

OTHER PUBLICATIONS

Office Action dated Aug. 29, 2019, in corresponding Chinese Patent Application No. 201810906029.4.

Primary Examiner — Thomas D Lee
(74) Attorney, Agent, or Firm — Oblon, McClelland, Maier & Neustadt, L.L.P.

(57) ABSTRACT

An image forming apparatus includes: a communication interface to communicate with a plurality of control terminals operated by different users; and circuitry to: authenticate the plurality of control terminals in an order that an authentication request is received from the control terminal; send an operational screen to each one of the plurality of control terminals that have been successfully authenticated for display at each control terminal, the operational screen to accept a process request for requesting the image forming apparatus to execute an image forming process; receive a plurality of process requests from the plurality of control terminals that have been authenticated in an order that the process request is accepted at the control terminal; and control an image forming device to execute a plurality of image forming processes according to the plurality of process requests in the order that the process request is accepted at the control terminal.

9 Claims, 11 Drawing Sheets

(52) U.S. Cl.
CPC ....... *H04N 1/00411* (2013.01); *H04N 1/4413* (2013.01); *H04N 2201/0094* (2013.01)

(56) References Cited

U.S. PATENT DOCUMENTS

| | | |
|---|---|---|
| 2008/0028438 A1* | 1/2008 | Sakakibara ........... G06F 21/608 726/2 |
| 2015/0103376 A1 | 4/2015 | Saeda |
| 2016/0019011 A1 | 1/2016 | Saeda |
| 2016/0179440 A1 | 6/2016 | Saeda |
| 2016/0381242 A1 | 12/2016 | Arakawa |
| 2017/0180585 A1 | 6/2017 | Saeda |
| 2018/0084134 A1 | 3/2018 | Saeda |
| 2019/0158693 A1 | 5/2019 | Saeda |

FOREIGN PATENT DOCUMENTS

| | | |
|---|---|---|
| JP | 5-216314 | 8/1993 |
| JP | 2014-011619 | 1/2014 |

* cited by examiner

FIG. 5A

| ORDER | PROCESS ID | PROCESS TYPE | USER ID | CONFIGURATION DATA | EXECUTION STATUS | |
|---|---|---|---|---|---|---|
| | | | | | READING UNIT | PRINTING UNIT |
| 1 | 10001 | PRINT | u001 | A3 | | EXECUTING |
| 2 | 10002 | COPY | u002 | READ MONOCHROME SINGLE-SIDED / A4, COMBINE IMAGES | | |
| ... | ... | ... | ... | ... | ... | ... |

FIG. 5B

| ORDER | PROCESS ID | PROCESS TYPE | USER ID | CONFIGURATION DATA | EXECUTION STATUS | |
|---|---|---|---|---|---|---|
| | | | | | READING UNIT | PRINTING UNIT |
| 1 | 10001 | PRINT | u001 | A3 | | EXECUTING |
| 2 | 10002 | SCAN IN COPY | u002 | READ MONOCHROME SINGLE-SIDED / A4, COMBINE IMAGES | EXECUTING | RESERVE 1 |
| 3 | 10003 | SCAN | u003 | READ IN COLOR, SINGLE-SIDED | RESERVE 1 | |
| 4 | 10004 | PRINT | u004 | B5 | | RESERVE 2 |
| ... | ... | ... | ... | ... | ... | ... |

FIG. 5C

| ORDER | PROCESS ID | PROCESS TYPE | USER ID | CONFIGURATION DATA | EXECUTION STATUS | |
|---|---|---|---|---|---|---|
| | | | | | READING UNIT | PRINTING UNIT |
| 1 | 10001 | PRINT | u001 | A3 | | COMPLETE |
| 2 | 10002 | PRINT IN COPY | u002 | READ MONOCHROME SINGLE-SIDED / A4, COMBINE IMAGES | | EXECUTING |
| 3 | 10003 | SCAN | u003 | READ IN COLOR, SINGLE-SIDED | EXECUTING | |
| 4 | 10004 | PRINT | u004 | B5 | | RESERVE 1 |
| ... | ... | ... | ... | ... | ... | ... |

FIG. 6

| USER ID | PASSWORD |
|---------|----------|
| u001 | p001 |
| u002 | p002 |
| u003 | p003 |
| u004 | p004 |
| ... | ... |

IMAGE FORMING APPARATUS FOR MANAGING SUBSTANTIALLY SIMULTANEOUS IMAGE PROCESSING REQUESTS

CROSS-REFERENCE TO RELATED APPLICATIONS

This patent application is based on and claims priority pursuant to 35 U.S.C. § 119(a) to Japanese Patent Application Nos. 2017-155914, filed on Aug. 10, 2017, and 2018-142516, filed on Jul. 30, 2018, in the Japan Patent Office, the entire disclosure of which is hereby incorporated by reference herein.

BACKGROUND

Technical Field

The present invention generally relates to an image forming apparatus, an image forming system, an image forming method, and a recording medium.

Description of the Related Art

Recently, image forming apparatuses such as MFPs (multifunctional peripherals) having the functions of copying, scanning, and printing, etc. are provided in a convenience store or the like. For example, there is a service to allow the user to print a thicket, such as a concert thicket, using the image forming apparatus at the convenience store. In such case, the image forming apparatus is being used by a plurality of users at substantially the same time.

SUMMARY

An image forming apparatus includes: a communication interface to communicate with a plurality of control terminals that are operated by different users; and circuitry to: authenticate the plurality of control terminals in an order that an authentication request is received from the control terminal; send an operational screen to each one of the plurality of control terminals that have been successfully authenticated for display at each control terminal, the operational screen being configured to accept a process request for requesting the image forming apparatus to execute an image forming process; receive a plurality of process requests from the plurality of control terminals that have been authenticated in an order that the process request is accepted at the control terminal; and control an image forming device to execute a plurality of image forming processes according to the plurality of process requests in the order that the process request is accepted at the control terminal.

Example embodiments of the present invention include an image forming system including the above-described image forming apparatus and one or more control terminals.

Example embodiments of the present invention include an image forming method, and a non-transitory recording medium storing an image forming control program.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 5A, 5B, and 5C are each a conceptual diagram illustrating an example of a requested process management table;

FIG. 6 is a conceptual diagram illustrating an example of an authentication data management table;

Figure 1:
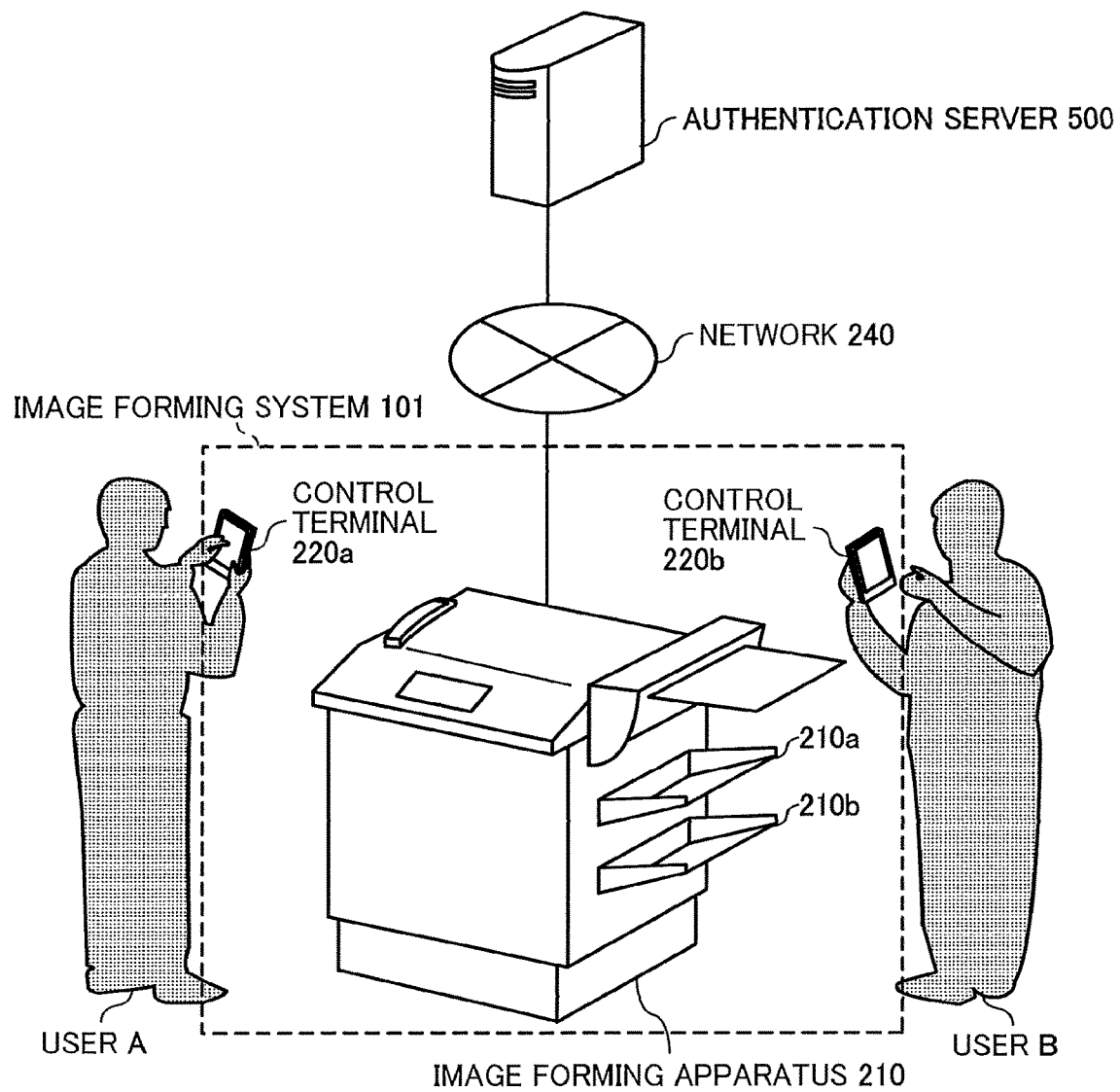
FIG. 1 is a schematic diagram illustrating an image forming system and an authentication server, according to an embodiment.

The accompanying drawings are intended to depict embodiments of the present invention and should not be interpreted to limit the scope thereof The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, one or more embodiments of the present invention are described.

«Overview»

Referring to FIG. 1, an overview of an image forming system 101 and an authentication server 500 is described according to an embodiment. FIG. 1 is a schematic diagram illustrating the image forming system 101 and the authentication server 500, according to the embodiment.

In FIG. 1, the image forming system 101 includes an image forming apparatus 210 and a plurality of control terminals 220a and 220b each capable of accepting operations from a user. Referring to FIG. 1, the user A operates the image forming apparatus 210 via the control terminal 220a. Similarly, the user B operates the same image forming apparatus 210 via the control terminal 220b.

Here, the control terminals 220a and 220b are collectively referred to as the "control terminal 220". While the image forming apparatus 210 is operated by the user A and the user B at substantially the same time, the image forming apparatus 210 may be operated by three or more users each through a different control terminal at substantially the same time.

In this embodiment, the image forming apparatus 210 is a multifunctional peripheral (MFP) having a plurality of functions including functions of copying, scanning, facsimile transmission, and printing. The image forming apparatus 210 is provided with two paper trays 210a and 210b, each of which receives a printed sheet being output. The paper trays 210a and 210b are each an example of a sheet output tray onto which a sheet is output. The paper tray 210a, at a top, is placed above the paper tray 210b, at a bottom. Further, three or more paper trays may be provided in the image forming apparatus 210. While the two paper trays 210a and 210b are provided, any number of paper trays may be provided.

The control terminal 220 includes a display section for displaying an operational screen such as a touch panel. The operational screen displays explanatory texts or "consent" buttons, and accepts input of a user ID, a password, and the like from the user. Further, the control terminal 220 mutually communicates with the image forming apparatus 210 by wireless communication in compliance with such as Bluetooth (Registered Trademark), Near Field Communication (NFC), or Wi-Fi. Note that the control terminal 220 may be a dedicated terminal that cooperatively operates with the image forming apparatus 210 or may be a smartphone etc. of the individual user.

The authentication server 500 is connected to the image forming apparatus 210 via a network 240 such as the Internet so as to communicate with each other. The authentication server 500 is a computer that authenticates the user as a data transmission source based on a user ID and a password sent from the control terminal 220 via the image forming apparatus 210. Note that the authentication server 500 may be implemented by a single computer or may be implemented by a plurality of computers.

«Hardware Configuration»

Figure 2:
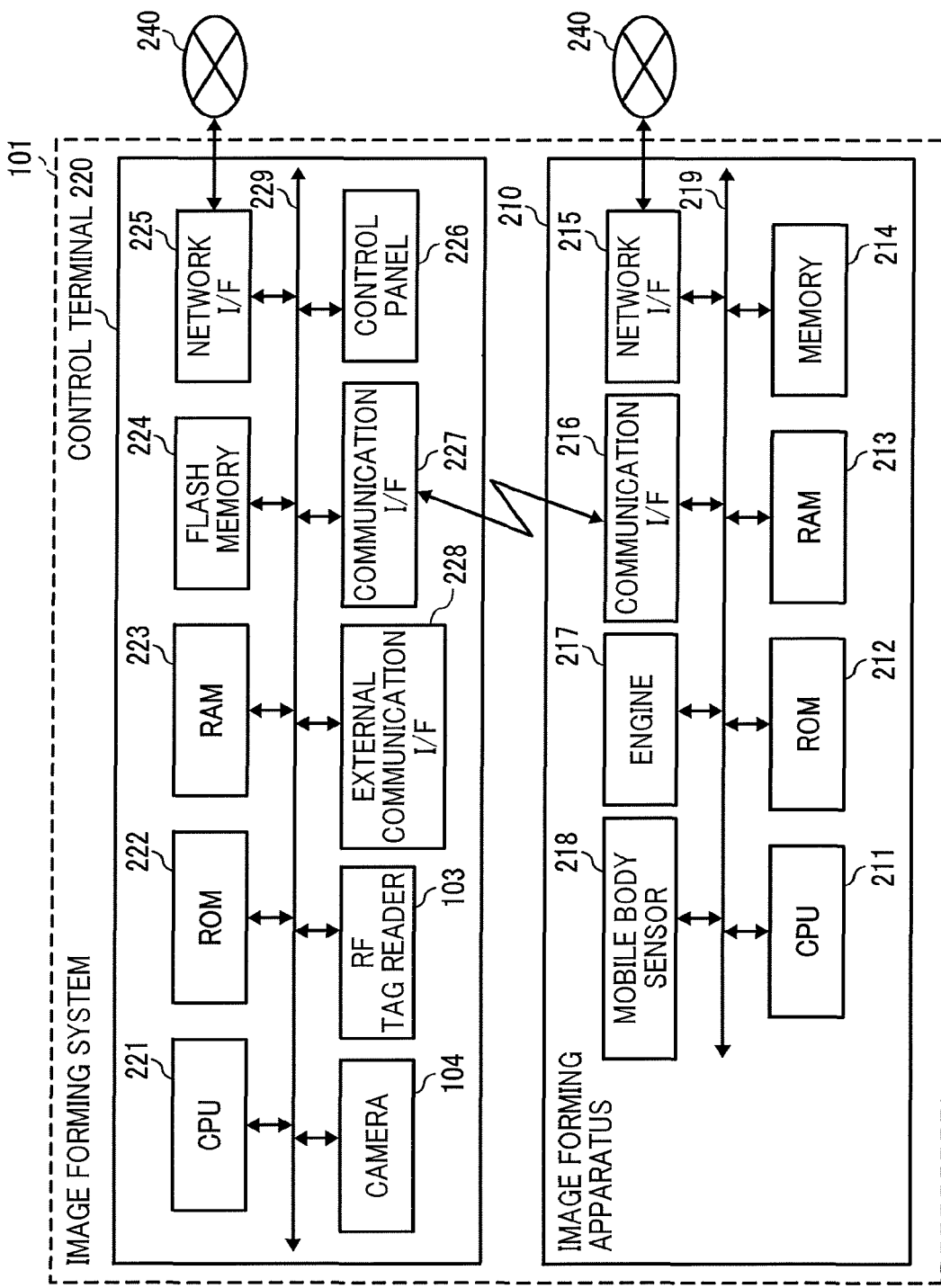
FIG. 2 is a schematic diagram illustrating a hardware configuration of the image forming system of FIG. 1, according to the embodiment.
Figure 3:
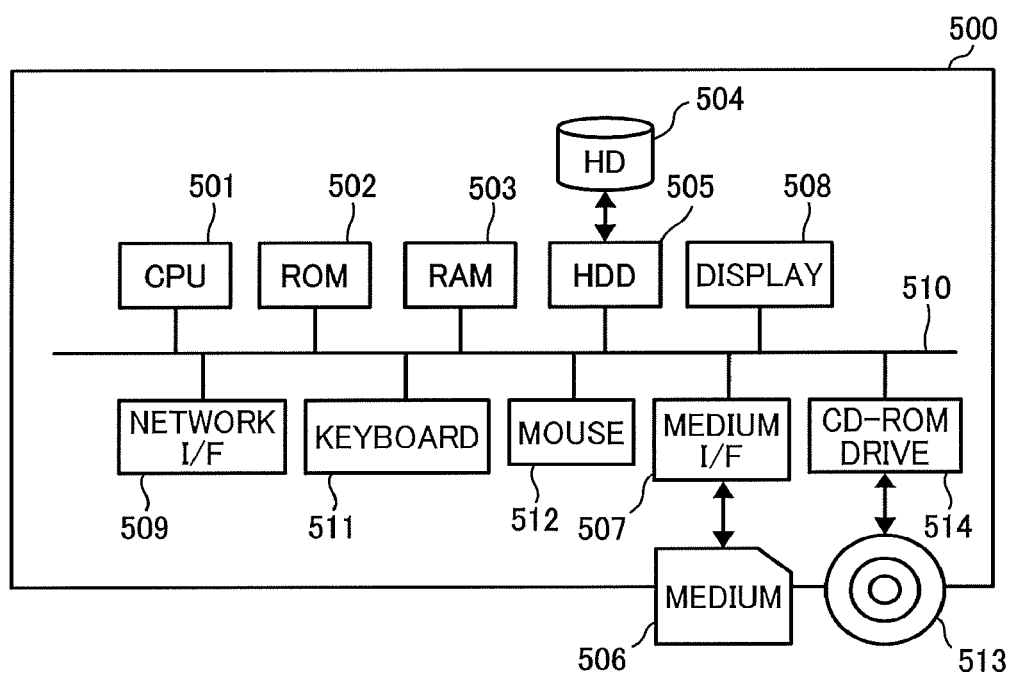
FIG. 3 is a schematic diagram illustrating a hardware configuration of the authentication server of FIG. 1, according to the embodiment.

Referring to FIGS. 2 and 3, a hardware configuration of the authentication server 500 and the image forming system 101 is described according to the embodiment.

<Hardware Configuration of Image Formation System>

Referring to FIG. 2, a hardware configuration of the image forming system 101 is described according to the embodiment. FIG. 2 is a diagram illustrating a hardware configuration of the image forming system 101 according to the embodiment.

(Hardware Configuration of Image Forming Apparatus)

First, a hardware configuration of the image forming apparatus 210 is described according to the embodiment. As illustrated in FIG. 2, the image forming apparatus 210 includes a central processing unit (CPU) 211, a read only memory (ROM) 212, a random access memory (RAM) 213, a memory 214, a network I/F 215, a network interface (I/F) 215, an engine 217, a mobile body sensor 218, and a system bus 219.

The CPU 211 loads programs stored in such as the ROM 212 or the memory 214 onto the RAM 213 as a work area, to execute the programs to perform entire operation of the image forming apparatus 210. For example, the CPU 211 controls the engine 217 to perform various types of functions including the above-described functions of copying, scanning, facsimile transmission, and printing.

The ROM 212 is a non-volatile memory, which stores, for example, Basic Input/Output System (BIOS) to be executed at a time of start-up of the image forming apparatus 210, or various configuration data. The RAM 213 is a volatile memory used as a work area or the like of the CPU 211. The memory 214 is, for example, a nonvolatile memory that stores OS (Operating System), application programs, and various data, and is implemented by, for example, Hard Disk Drive (HDD), Solid State Drive (SSD), and the like.

The network interface (I/F) 215 is a network interface circuit such as a wireless LAN, a wired LAN, or the like for connecting the image forming apparatus 210 to the network 240 so as to enable communication with an external apparatus connected to the network 240. The communication I/F 216 is an interface to enable communication of the image forming apparatus 210 with the control terminal 220.

The engine 217 is hardware for performing various image processing such as copying, scanning, facsimile communication (transmission), and printing, or any processing other than the general-purpose information processing and communication. Specifically, the engine 217 includes a scanner that scans an original document into image data, and a plotter that prints an image on a sheet material such as paper. The engine 217 may optionally include a finisher that performs finishing such as punching, stapling, or sorting the printed sheets, and an automatic document feeder (ADF) that automatically feeds the original document.

The mobile body sensor 218 is a sensor for detecting a moving body such as a human body, within a detection range around the image forming system 101, and may be implemented by a pyroelectric sensor, for example. In this embodiment, the image forming system 101 does not have to be provided with the mobile body sensor 218.

The system bus 219 is connected to each of the above-described elements, and transfers an address signal, a data signal, or various other control signals between the elements.

(Hardware Configuration of Control Terminal)

Next, a hardware configuration of the control terminal 220 is described according to the embodiment. As illustrated in FIG. 2, the control terminal 220 is implemented by a mobile terminal that can be carried by the user such as a tablet PC, a smart phone, etc. The control terminal 220 is installed with software that is capable of displaying an operational screen provided by the image forming apparatus 210. Specifically, the control terminal 220 includes a CPU 221, ROM 222, RAM 223, flash memory 224, network I/F 225, control panel 226, communication I/F 227, external communication I/F 228, RF tag reader 103, camera 104, and system bus 229.

The CPU 221 loads programs stored in such as the ROM 222 or the flash memory 224 onto the RAM 223 as a work area, to execute the programs to perform entire operation of the control terminal 220.

The ROM 222 is a non-volatile memory, which stores, for example, BIOS to be executed at a time of start-up of the control terminal 220, or various configuration data. The RAM 223 is a volatile memory used as a work area or the like of the CPU 221. The flash memory 224 stores OS, various application programs, and various data.

The network I/F 225 is a network interface circuit such as a wireless LAN, a wired LAN, or the like for connecting the control terminal 220 to the network 240 so as to enable communication with an external apparatus connected to the network 240. The network I/F 225 does not have to be provided.

The control panel 26 receives various inputs made through user operation, and controls display of various information. The control panel 26 is implemented by a liquid crystal display (LCD) with a touch sensor, but not limited to this. For example, the control panel 26 may be implemented by an organic electroluminescence (OEL) with a touch sensor. In addition or in alternative to the LCD or OEL, a control panel such as hardware keys or an alarm device such as a lamp may be provided.

The communication I/F 227 is an interface circuit to enable communication of the control terminal 220 with the image forming apparatus 210.

The external communication I/F 228 is an interface circuit, such as a USB, which connects the control terminal 220 to various external devices. The external device connected to the external communication I/F 228 may include, for example, the camera 104 attached to an outer face of the control terminal 220, the RF tag reader 103, and the like.

The RF tag reader 103 is an example of a wireless communication device that acquires from a RFID tag specific information to be used for authentication by wireless communication. As described above, the RF tag reader 103 may be provided on the outer face of the control terminal 220.

The camera 104 is an example of an image capturing apparatus that captures an image of a user. As described above, the camera 104 may be provided on the outer face of the control terminal 220.

Some devices such as the RF tag reader 103 and the camera 104 are optionally provided.

The system bus 229 is connected to each of the above-described elements, and transfers an address signal, a data signal, or various other control signals between the elements.

The image forming apparatus 210 may be provided with a control panel having the same configuration as that of the control panel 226, which may be freely attached to or removed from a body of the image forming apparatus 210. In such case, the image forming apparatus 210 and the control terminal 220 are each provided with a control panel.

<Hardware Configuration of Authentication Server>

FIG. 3 is a schematic diagram illustrating a hardware configuration of the authentication server 500, according to the embodiment. The authentication server 500, which may be implemented by a computer, includes a CPU 501, a ROM 502, a RAM 503, a hard disk (HD) 504, a hard disk drive (HDD) 505, a medium I/F 507, a display 508, a network I/F 509, a keyboard 511, a mouse 512, a CD-ROM drive 514, and a bus line 510. Since the authentication server 500 operates as a server, an input device such as the keyboard 511 and the mouse 512, or an output device such as the display 508 does not have to be provided. The CPU 501 controls entire operation of the authentication server 500. The ROM 502 stores a control program for controlling the CPU 501 such as an initial program loader (IPL). The RAM 503 is used as a work area for the CPU 501. The HD 504 stores various data such as a control program. The HDD 505 controls reading or writing of various data to or from the HD 504 under control of the CPU 501. The medium I/F 507 controls reading or writing of data with respect to a recording medium 506 such as a flash memory. The display 508 displays various information such as a cursor, menu, window, characters, or image. The network I/F 509 is an interface circuit that controls communication of data with an external device through the network 240. The keyboard 511 is one example of input device provided with a plurality of keys for allowing a user to input characters, numerals, or various instructions. The mouse 512 is one example of input device for allowing the user to select a specific instruction or execution, select a target for processing, or move a curser being displayed. The CD-ROM drive 514 reads or writes various data with respect to a Compact Disc ROM (CD-ROM) 513, which is one example of removable recording medium.

The authentication server 500 further includes the bus line 510. The bus line 510 may be an address bus or a data bus, which electrically connects various elements such as the CPU 501 of FIG. 3.

«Functional Configuration»

Figure 4:
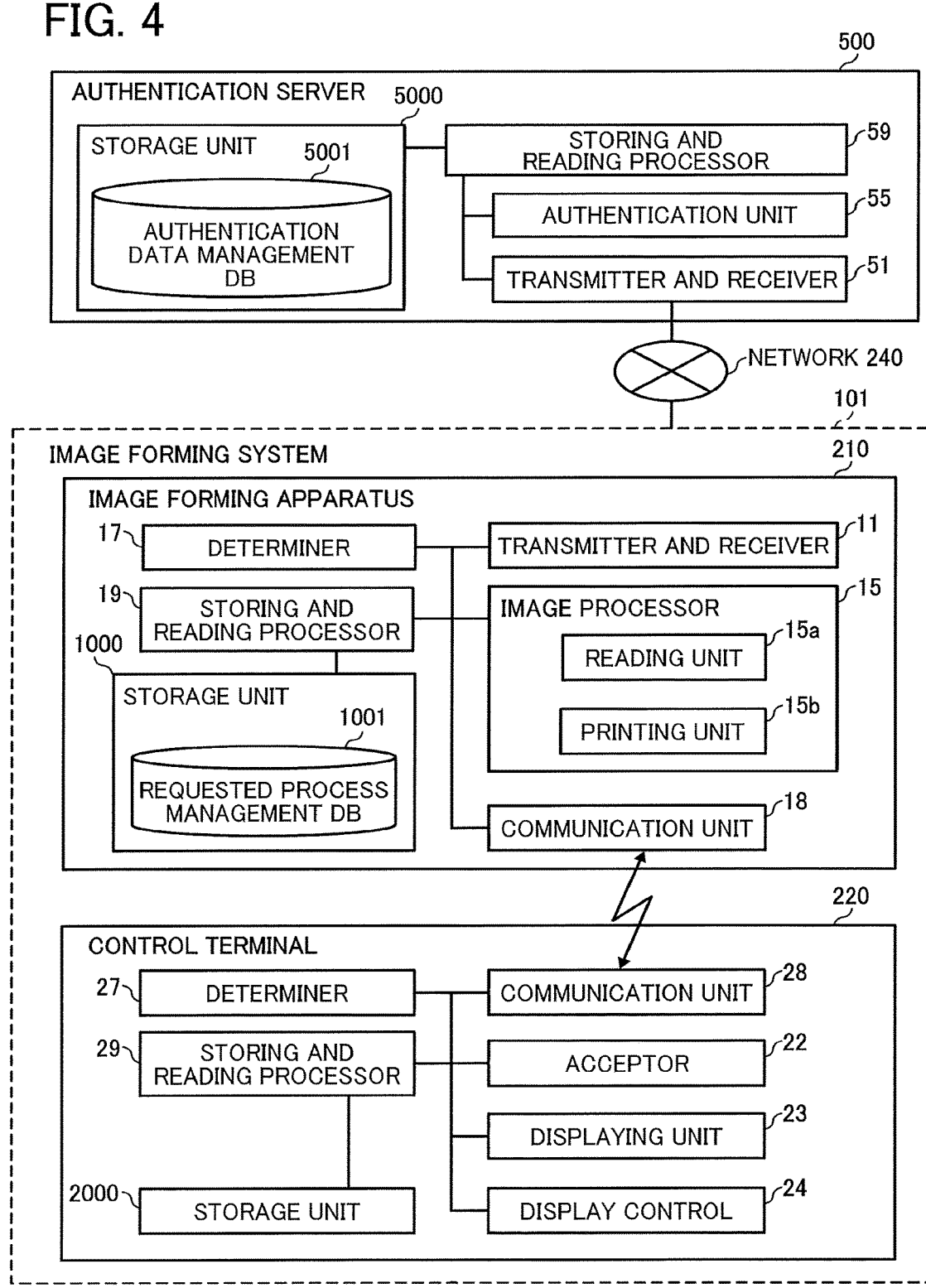
FIG. 4 is a schematic diagram illustrating a functional configuration of the image forming system and the authentication server of FIG. 1, according to the embodiment.

Referring to FIG. 4, a functional configuration of the image forming system 101 and the authentication server 500 is described according to the embodiment. FIG. 4 is a schematic diagram illustrating a functional configuration of the image forming system 101 and the authentication server 500, according to the embodiment. FIGS. 5A to 5C are each a conceptual diagram illustrating an example of a requested process management table, according to the embodiment. FIG. 6 is a conceptual diagram illustrating an example of an authentication data management table.

<Functional Configuration of Image Forming Apparatus>

First, a functional configuration of the image forming apparatus 210 in the image forming system 101 is described according to the embodiment. The image forming apparatus 210 includes a transmitter and receiver 11, an image processor 15, a determiner 17, a communication unit 18, and a storing and reading processor 19. The image processor 15 includes a reading unit 15a and a printing unit 15b. The reading unit 15a and the printing unit 15b are each capable of performing processing independent from each other. For example, even during when the printing unit 15b is executing processing, the reading unit 15a is able to start processing without waiting for the printing unit 15b to end processing. The image forming apparatus 210 further includes a storage unit 1000, which is implemented by the ROM 212, RAM 213 or memory 214.

(Requested Process Management Table)

The storage unit 1000 stores therein a requested process management DB 1001, which is implemented by a requested process management table as illustrated in FIGS. 5A to 5C. FIG. 5A illustrates contents in the requested process management table at a certain time. FIG. 5B illustrates contents in the requested process management table, at any time after the certain time of FIG. 5A. FIG. 5C illustrates contents in the requested process management table, at any time after the time of FIG. 5B.

The requested process management table stores, for each record, information relating to a requested process (a requesting job). Specifically, the requested process management table stores, for each record of a requested process, an order of which the requested process is performed, a process ID identifying the requested process, a process type of the requested process, configuration data for the requested process, and an execution status. The order of which the requested process is performed is determined based on the order of which the image forming apparatus 210 has received a process start request for performing such requested process from the control terminal 220, as described below. The process ID is assigned by the storing and reading processor 19, and is an example of identifier for identifying each requested process. The process type indicates a type of the requested process, which corresponds to one of copying, scanning (including scanning for facsimile transmission), and printing in this example. The configuration data indicates various types of configuration data to be used for image processing, which is received by the control terminal 220 from the user. The execution status indicates an execution status of each of the reading unit 15a and the printing unit 15b in executing the requested process, or a part of the requested process. The storing and reading processor 19 obtains execution status information from the reading unit 15a or the printing unit 15b, when the execution status has changed in the reading unit 15a or the printing unit 15b, to update the execution status information in the requested process management DB 1001.

(Functional Units of Image Forming Apparatus)

The transmitter and receiver 51, which is implemented by the instructions of the CPU 211 and the network I/F 215, illustrated in FIG. 2, transmits or receives various types of data (or signals) to or from the authentication server 500 through the network 240.

The reading unit 15a, which is implemented by the instructions of the CPU 211 and the engine 217, illustrated in FIG. 2, reads an original document to generate image data. More specifically, the reading unit 15a corresponds to a scanner engine, which operates under control of the CPU 211. The printing unit 15b, which is implemented by the instructions of the CPU 211 and the engine 217, illustrated in FIG. 2, prints an image based on the image data. More specifically, the printing unit 15b corresponds to a plotter engine, which operates under control of the CPU 211.

The determiner 17 is implemented by the instructions of the CPU 211, illustrated in FIG. 2, to perform various determinations.

The communication unit 18, which is implemented by the instructions of the CPU 211 and the communication interface I/F 216, illustrated in FIG. 2, transmits or receives various types of data (or signals) to or from the control terminal 220 by wireless communication.

The storing and reading processor 19, which is implemented by the instructions of the CPU 211 illustrated in FIG. 2, performs processing to store various types of data in the storage unit 1000 or read various types of data stored in the storage unit 1000.

<Functional Configuration of Control Terminal>

The control terminal 220 includes an acceptor 22, a displaying unit 23, a display control 24, a determiner 27, a communication unit 28, and a storing and reading processor 29. The control terminal 220 further includes a storage unit 2000 implemented by the ROM 222, RAM 223, or the flash memory 224.

(Functional Units of Control Terminal)

The acceptor 22, which is implemented by the instructions of the CPU 221 and the control panel 226 in FIG. 2, accepts user operations.

The displaying unit 23, which is implemented by a display section of the control panel 226 illustrated in FIG. 2, controls display of various screens.

The display control 24, which is implemented by the instructions of the CPU 221 and the control panel 226 illustrated in FIG. 2, controls the displaying unit 23 to display various screens.

The determiner 27, which is implemented by the instructions of the CPU 221, illustrated in FIG. 2, performs various determinations.

The external communication I/F 228, which is implemented by the instructions of the CPU 221 and the communication I/F 227, illustrated in FIG. 2, transmits or receives various types of data (or signals) to or from the image forming apparatus 210 by wireless communication.

The storing and reading processor 29, which is implemented by the instructions of the CPU 221 illustrated in FIG. 2, performs processing to store various types of data in the storage unit 2000 or read various types of data stored in the storage unit 2000.

<Functional Configuration of Authentication Server>

Next, still referring to FIG. 4, a functional configuration of the authentication server 500 is described according to the embodiment. The authentication server 500 includes a transmitter and receiver 51, an authentication unit 55, and a storing and reading processor 59. The authentication server 500 further includes a storage unit 5000, which may be implemented by the ROM 502, RAM 503, or HD 504.

(Authentication Data Management Table)

The storage unit 5000 stores an authentication data management DB 5001, which is implemented by an authentication data management table illustrated in FIG. 6.

The authentication data management table stores, for each user who is previously registered, a user ID for identifying the user, and a password, in association.

(Functional Units of Authentication Server)

The transmitter and receiver 51, which is implemented by the instructions of the CPU 501 and the network I/F 509, illustrated in FIG. 3, transmits or receives various types of data (or signals) to or from the image forming apparatus 210 or the control terminal 220 through the network 240.

The authentication unit 55, which is implemented by instructions of the CPU 501 illustrated in FIG. 3, authenticates the user based on a user ID and a password sent from the image forming apparatus 210 or the control terminal 220.

The storing and reading processor 59, which is implemented by the instructions of the CPU 501 illustrated in FIG. 3, performs processing to store various types of data in the storage unit 5000 or read various types of data stored in the storage unit 5000.

«Operation»

Referring now to FIGS. 4 to 9, operation of processing image forming is described according to an embodiment.

The following embodiment is applicable, for example, to the example case in which the the image forming apparatus 210 is disposed at a convenience store, and is provided with a service to print a concert thicket in response to a request from a user. In such case, the image forming apparatus 210 displays various operational screens to the user to complete processing to print the thicket. That is, in order to print the thicket, the user needs to input authentication information (such as a user ID and a password) for authentication, read explanatory text, press some buttons, etc., through different operational screens. Assuming that there is a plurality of users who is operating the image forming apparatus 210 at substantially the same time, the image forming apparatus 210 usually performs processing to print, in the order of authenticating the user. Accordingly, if a first user who has been authenticated earlier happens to be unfamiliar with processing to print (such as the processing to print the concert thicket), a second user who has been authenticated later may need to wait until the first user finishes printing, even though the image forming apparatus 210 is free to process printing or any other processing.

In view of this, the image forming apparatus 210 according to the embodiment controls an order of executing a plurality of processes requested by a plurality of users, which are received at substantially the same time, such that the processes are performed more efficiently.

Figure 7:
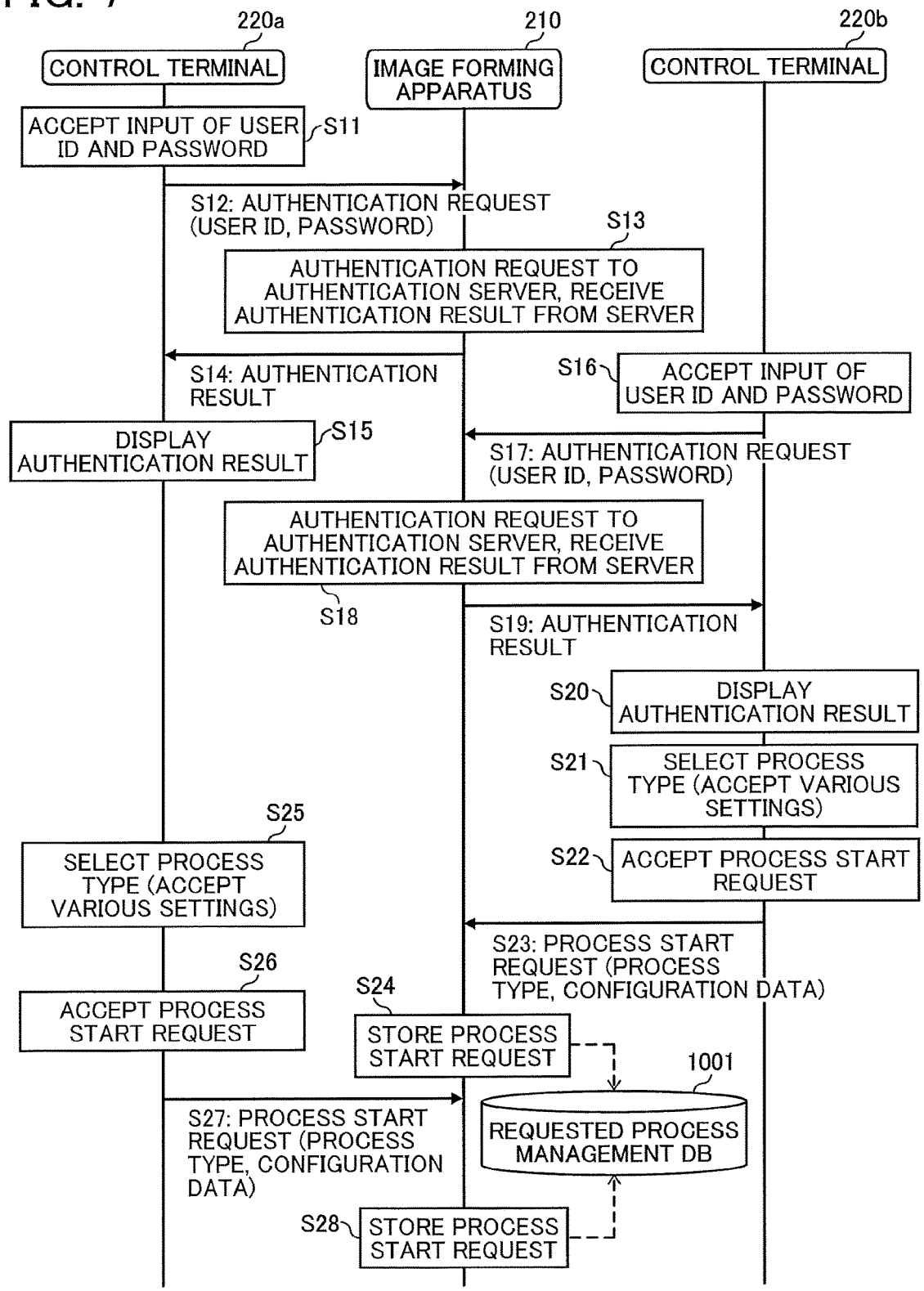
FIG. 7 is a sequence diagram illustrating operation of accepting a plurality of requests, performed by the image forming apparatus, according to an embodiment.

FIG. 7 is a sequence diagram illustrating operation of processing a plurality of processes to be performed by the image forming apparatus 210, which are received from the control terminal 220a and the control terminal 220b, respectively, according to the embodiment. In this embodiment, it is assumed that the image forming apparatus 210 is performing printing according to an instruction from a third user, other than the user A and the user B. During when the process requested by the third user is being performed, the image forming apparatus 210 receives an instruction from each of the user A and the user B. More specifically, the user A firstly completes authentication by the image forming apparatus 210, and the user B secondly completes authentication by the image forming apparatus 210, after authentication of the user A. However, the user B has finished input of instructions before completion of inputs of instructions by the user A, and the user A has finished input of instructions after completion of inputs of instructions by the user B. In such case, the image forming apparatus 210 firstly executes processing according to the request from the user B, even when the user A has been authenticated first.

As illustrated in FIG. 7, the acceptor 22 of the control terminal 220a receives a user ID and a password of the user A, from the user A (S11).

The communication unit 28 of the control terminal 220a transmits authentication request information, which is an authentication request, to the image forming apparatus 210 (S12). The authentication request information includes the user ID and the password, received at S11. The communication unit 18 of the image forming apparatus 210 receives the authentication request information.

Next, the transmitter and receiver 11 of the image forming apparatus 210 transmits the authentication request information to the transmitter and receiver 51 of the authentication server 500. The transmitter and receiver 51 of the authentication server 500 receives the authentication result information (S13). At the authentication server 500, the authentication unit 55 authenticates to determine whether or not the user is a legitimate user, based on whether or not the authentication data management DB 5001 stores a pair of the user ID and the password that is the same as a pair of the user ID and the password in the authentication request information. The following describes an example case in which the user is determined to be a legitimate user.

The communication unit 18 of the image forming apparatus 210 transmits the authentication result information to the control terminal 220a (S14). The communication unit 28 of the control terminal 220a receives the authentication result information. Next, the display control 24 of the control terminal 220a controls the displaying unit 23 to display an authentication result indicating that authentication is successful (S15). The authentication result may be a message indicating that authentication is successful. In addition to or in alternative to the authentication result, the display control 24 may display an image based on the operation screen that is transmitted from the image forming apparatus 210 based on the successful authentication result. Through the operation screen, the user A is able to set input various types of information relating to a process to be requested.

Subsequently, the user B, who came to the image forming apparatus 210 after the user A performs the above-described authentication, performs the same processing as described above referring to S11 to S15 using the control terminal 220b (S16 to S20).

Then, while the user A takes time to input instructions to the operational screen, the user B selects the process type and sets various types of configuration on the operational screen, such that the acceptor 22 of the control terminal 220b receives the inputs from the user B (S21). The process type indicates one of image forming processing selected from copying, scanning (including facsimile transmission), and printing. The various types of configuration, i.e., the configuration data, includes, in the case of copying, information on whether an image is to be read in monochrome or color, an image is to be read is single-sided or double-sided, a size of print sheet, and whether to combine images in one print sheet, etc. For example, as illustrated in FIG. 5A, information indicating that image is to be read in monochrome for the single-sided, and to be printed on A4 sized paper with combined images, may be stored as configuration data.

Next, the acceptor 22 of the control terminal 220b receives a process start request from the user B on the operational screen (S22). More specifically, the control terminal 220b receives a request for executing a specific process with information relating to such process, such as the process type and configuration data. The communication unit 28 of the control terminal 220b transmits process start request information indicating a process start request to the image forming apparatus 210 (S23). The process start request information includes the process type and the configuration data that are received at S21. The communication unit 18 of the image forming apparatus 210 receives the process start request information.

Next, the storing and reading processor 19 of the image forming apparatus 210 stores the process start request information (S24). Specifically, as illustrated in FIGS. 5A to 5C, the storing and reading processor 19 generates a process ID in accordance with the order of receiving the process start request, and stores information including the process type, the user ID of the user who has sent the process request, and the configuration data for each requested process. While the user ID may be included in the process start request, the user ID may be received separately from the process start request, for example, at a time of authentication. Furthermore, the storing and reading processor 19 starts managing, for each requested process with the process ID assigned, the execution status of the process to be performed by the reading unit 15a and the printing unit 15b, respectively (or the reading unit 15a or the printing unit 15b). For example, the table of FIG. 5A illustrates the requested process management table of when the image forming apparatus 210 has received a request from the user B, while performing a process requested by the third user.

In such case, the table of FIG. 5A stores, as a process to be firstly performed, a requested print process (process ID "10001"), which has been requested by the third user, with the status indicating that the printing unit 15b is executing the process. More specifically, for the print process, the process type "print", the user ID of the third user, and the configuration data indicating to print in A3 size paper are stored, with the execution status of that print process. Further, in response to reception of the process request from the user B, the storing and reading processor 19 of the image forming apparatus 210 stores, as a process to be secondly processed, a requested copy process (process ID "10002"), which has been requested by the user B. In this example, the copy process (an example of a third process) is a combination of the scan process (an example of a first process) and the print process (an example of a second process).

Referring to FIG. 7, the control terminal 220a operated by the user A performs processing of selecting a process type and set configuration data, via the operational screen for the image forming apparatus 210, as described above referring to S21 to S24 (S25 to S28). As illustrated in FIG. 5B, the storing and reading processor 19 additionally stores, as a process to be thirdly processed, a requested scan process (process ID "10003"), which has been requested by the user A.

Figure 8:
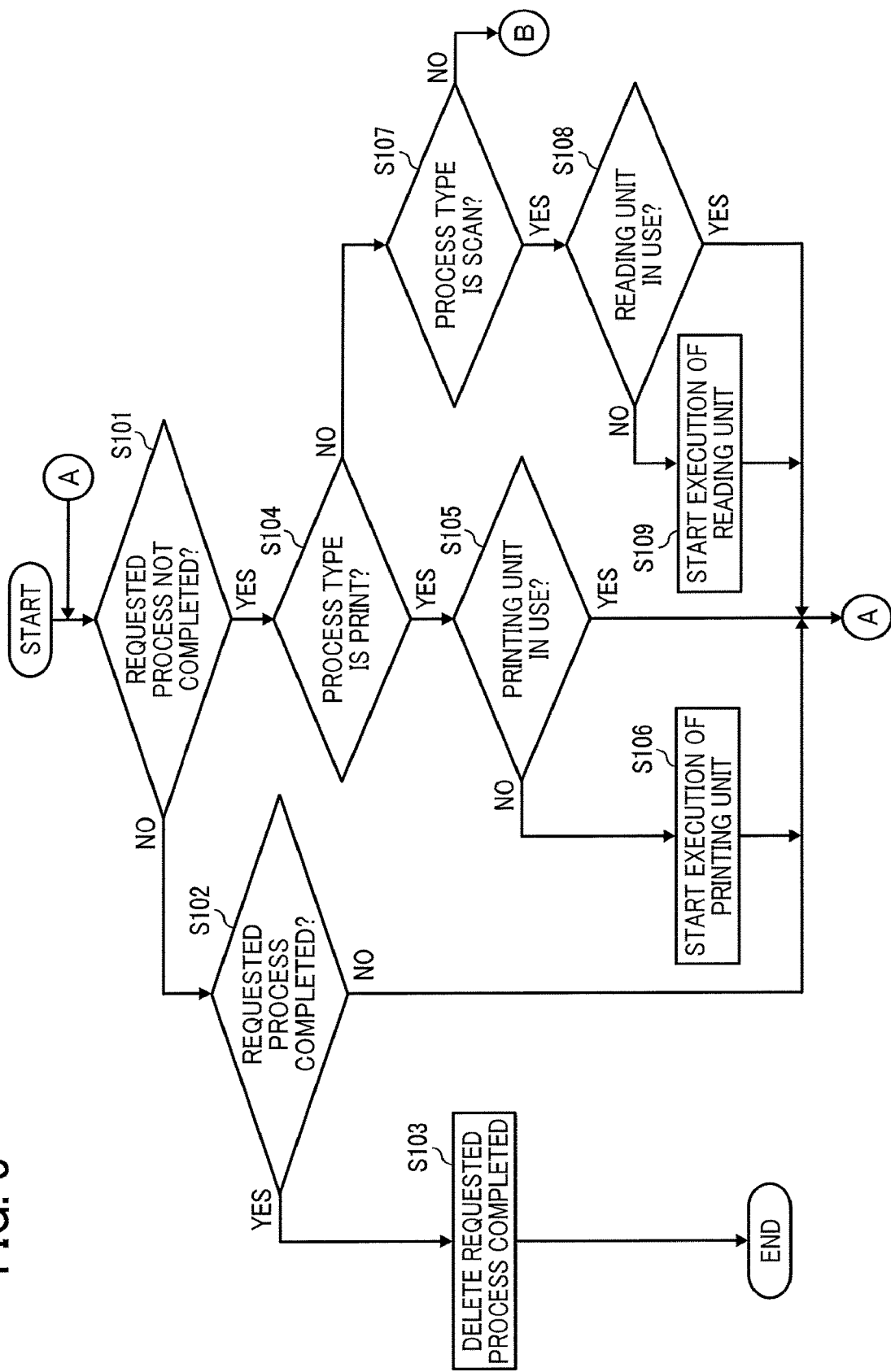
FIG. 8 is a flowchart illustrating operation of controlling a plurality of processes requested by a plurality of users, performed by the image forming apparatus, according to an embodiment.
Figure 9:
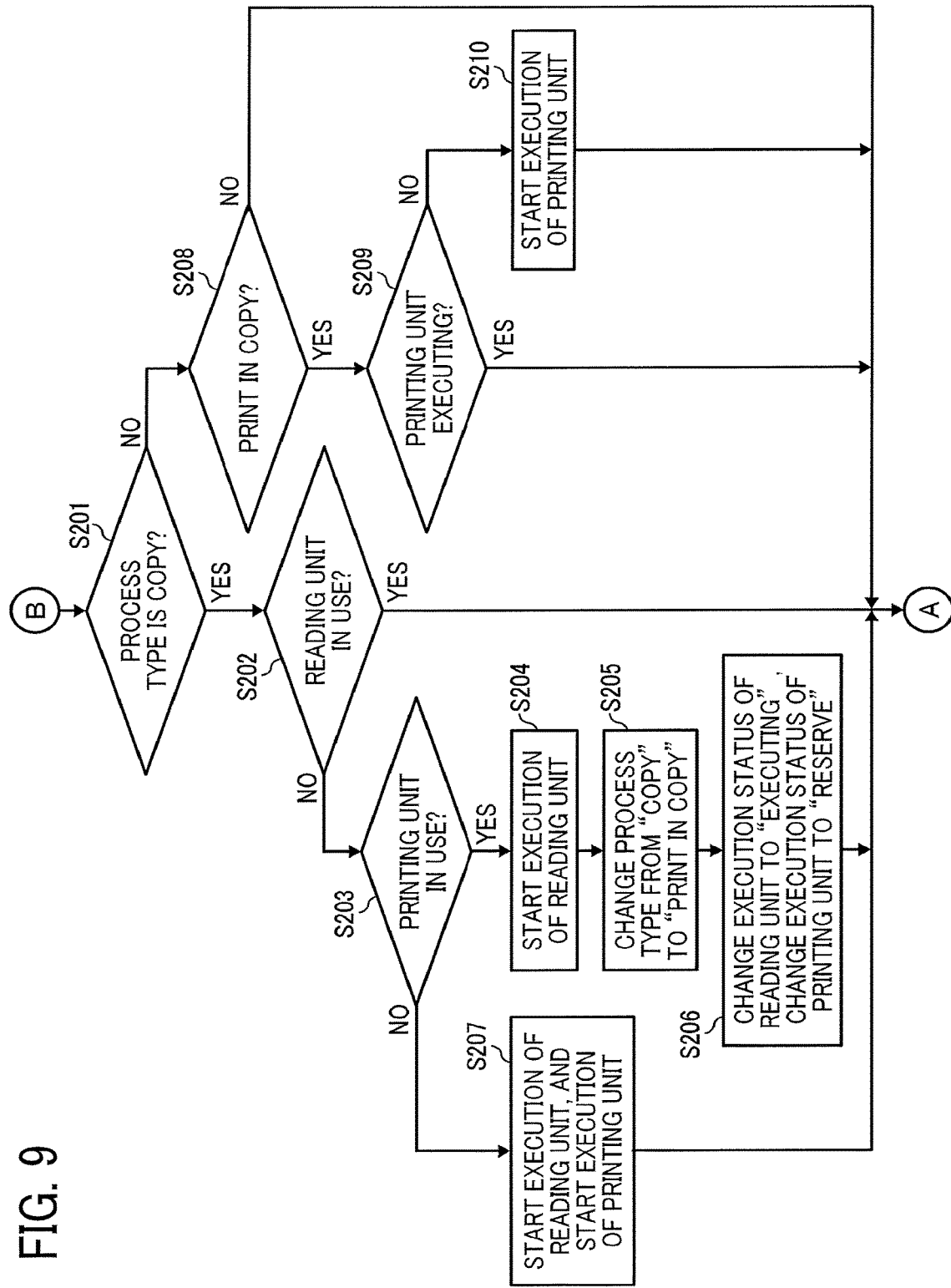
FIG. 9 is a flowchart illustrating operation of controlling a plurality of processes requested by a plurality of users, which is performed after FIG. 8, according to the embodiment.

Referring now to FIGS. 8 and 9, processing performed by the image forming apparatus 210 is described according to the embodiment. FIGS. 8 and 9 are a flowchart illustrating processing of controlling a plurality of requested processes, performed by the image forming apparatus 210, according to the embodiment. The following operation is performed by the CPU 211 according to a control program.

First, the determiner 17 of the image forming apparatus 210 determines whether any one of the requested processes in the requested process management DB 1001 is not completed (S101). Specifically, for each requested process being managed, the determiner 17 refers to the execution status of the requested process to determine if the requested process is not completed.

When there is no requested process that is not completed (S101: NO), the determiner 17 determines that there is no requested process to be executed. The determiner 17 proceeds to S102 to determine whether or not any one of the requested processes in the requested process management DB 1001 is completed (S102). When there is at least one requested process that is completed (S102: YES), the storing and reading processor 19 deletes information on the completed requested process (S103). For example, referring to FIG. 5C, the entire record (row) of the requested process with the process ID "10001" is deleted, since the execution status is "complete". The operation then ends, at least for a predetermined time period or until a request for executing a process is received. Alternatively, after S103, the operation may return to S101.

In contrary, when there is no requested process that is completed (S102: NO) at S102, the operation returns to S101. Alternatively, the operation may end, at least for a predetermined time period or until a request for executing a process is received.

At S101, when there is at least one requested process that is not completed in the requested process management DB 1001 (S101: YES), the operation proceeds to S104 for each requested process that is not completed. Specifically, the determiner 17 determines whether or not the process type for that process is "print" (S104). When the process type is "print" (S104: YES), the determiner 17 determines whether or not the printing unit 15b is executing any process (i.e., the printing unit 15b is in use to execute any requested process) (S105). When the printing unit 15b is executing the process (S105: YES), the operation returns to S101. On the other hand, when it is determined at S105 that the printing unit 15b is not executing any process (i.e., the printing unit 15b is not in use to execute any requested process) (S105: NO), the printing unit 15b starts executing the print process using the engine 217 (S106).

Next, at S104, when the process type is not "print" (S104: NO), the determiner 17 determines whether or not the process type is "scan" (S107). When the process type is "scan" (S107: YES), the determiner 17 determines whether or not the reading unit 15a is executing any requested process (i.e., the reading unit 15a is in use to execute any requested process) (S108). When the reading unit 15a is executing any process (S108: YES), the operation returns to 5101. On the other hand, when the reading unit 15a is not executing any process (i.e., the reading unit 15a is not in use to execute any requested process) (S108: NO), the reading unit 15a starts executing the scan process using the engine 217 (S109).

When the process type is not "scan" at S107 (S107: NO), as illustrated in FIG. 9, the determiner 17 determines whether or not the process type is "copy" (S201). When the process type is "copy" (S201: YES), the determiner 17 determines whether or not the reading unit 15a is executing any requested process (i.e., the reading unit 15a is in use to execute any requested process) (S202). When the reading unit 15a is executing any process (S202: YES), the operation returns to S101 illustrated in FIG. 8. On the other hand, when the reading unit 15a is not executing any process at 5202 (S202: NO), the determiner 17 determines whether or not the printing unit 15b is executing any requested process (S203). When the printing unit 15b is executing any requested process (S203: YES), the reading unit 15a starts executing the scan process using the engine 217 (S204).

For example, even when the "print" process requested to be started earlier is being executed by the printing unit 15b, the "scan" process can be executed by the reading unit 15a, as the reading unit 15a and the printing unit 15b are capable of operating independently from each other. Of the "copy" process (that is, a combination of the "scan" process and "print" process) requested to be started later, the reading unit 15a starts execution of the "scan" process.

Next, as illustrated in FIG. 5B, the storing and reading processor 19 changes the process type from "copy" to "scan in copy" in the requested process management DB 1001 (S205). Furthermore, in the requested process management DB 1001, the storing and reading processor 19 changes the execution status of the reading unit 15a to "executing", and the execution status of the printing unit 15b to "reserve" (S206). The operation then returns to S101 illustrated in FIG. 8.

For example, at S205 and S206, it is assumed that the scan process in the process type "copy" of the process ID "10002" as illustrated in FIG. 5A starts. As illustrated in FIG. 5B, the process type of the same process ID "10002" is changed from "copy" to "scan in copy". Further, the execution status of the reading unit 15a is changed to "executing", and the execution status of the printing unit 15b is changed to "reserve 1 ". It should be noted that the order of making reservations, indicated by the numeral assigned to the execution status "reserve" is assigned by the storing and reading processor 19 based on the order of processing the requested processes.

Still referring to FIG. 9, when the printing unit 15b is not executing (S203: NO) at S203, the reading unit 15a starts executing the scan process, and then the printing unit 15b executes the print process (S207). The operation then returns to S101 illustrated in FIG. 8. On the other hand, when the process type is not "copy" (S201: NO) at S201, the determiner 17 determines whether or not there is any requested process whose process type is "print in copy" in the requested process management DB 1001 (S208). If there is any requested process which is "print in copy" (S208: YES), the determiner 17 determines whether or not the printing unit 15b is executing any requested process by referring to the requested process management DB 1001 (S209). When the printing unit 15b is executing (S209: YES), the operation returns to S101 illustrated in FIG. 8.

At S209, when the printing unit 15b is not executing (S209: NO), the printing unit 15b starts execution of the print in copy process (S210). This completes the copy process, even when there is any print process in copy that has been reserved.

On the other hand, if there is no requested process "print in copy" at S208 (S208: NO), the operation returns to S101 illustrated in FIG. 8.

Referring to FIGS. 5A to 5C and FIGS. 8 and 9, the operation of controlling the print process requested by the third user, the copy process requested by the user B, and the scan process requested by the user A is described according to a specific example of the embodiment.

As illustrated in FIG. 5A, the image forming apparatus 210 stores, in the requested process management DB 1001, the copy process requested by the user B, in addition to the print process requested by the third user that the image forming apparatus 210 is currently executing. In such case, referring to FIGS. 8 and 9, for the copy process, the CPU 211 determines that the requested process is not completed at S101, and the process type is copy at S201. The CPU 211 further determines that the reading unit 15a is not in use at S202, and the printing unit is in use at S203, to proceed to perform S204, S205, and S206. Accordingly, the image forming apparatus 210 performs the scan in copy process, as illustrated in FIG. 5B.

Referring to FIG. 5B, as the image forming apparatus 210 receives a request from the user A, the image forming apparatus 210 stores, in the requested process management DB 1001, the scan process requested by the user A. In such case, referring to FIGS. 8 and 9, for the scan process, the CPU 211 determines that the requested process is not completed at S101, and the process type is scan at S107. The CPU 211 further determines that the reading unit 15a is in use at S108, and enters the "Reserve 1" for the execution status to indicate that the scan process requested by the user A is to be executed next.

Referring to FIG. 5C, after the scan in copy process has been executed, the CPU 211 changes the process type, from the scan in copy process to the print in copy process, and the execution status for the printing unit 15b is changed to "executing".

Still referring to FIG. 5C, for the scan process requested by the user A, the image forming apparatus 210 determines that the requested process is not completed at S101, and the requested process is the scan process at S107. The CPU 211 further determines that the reading unit 15a is not in use at S108, and starts executing the reading unit 15a at S109. Accordingly, the execution status for the scan process is changed to "executing".

Through processing of FIGS. 8 and 9, the image forming apparatus 210 is able to efficiently use the reading unit 15a and the printing unit 15b to perform a plurality of requested processes concurrently.

If the plurality of requested processes, such as printing and copying, is to be performed concurrently, the image forming apparatus 210 outputs printed sheets at substantially the same time for different users. In order to avoid the printed sheets be mixed between different jobs, the image forming apparatus 210 outputs a notification indicating a paper tray on which printed sheets of a specific job are output as described below.

Figure 10:
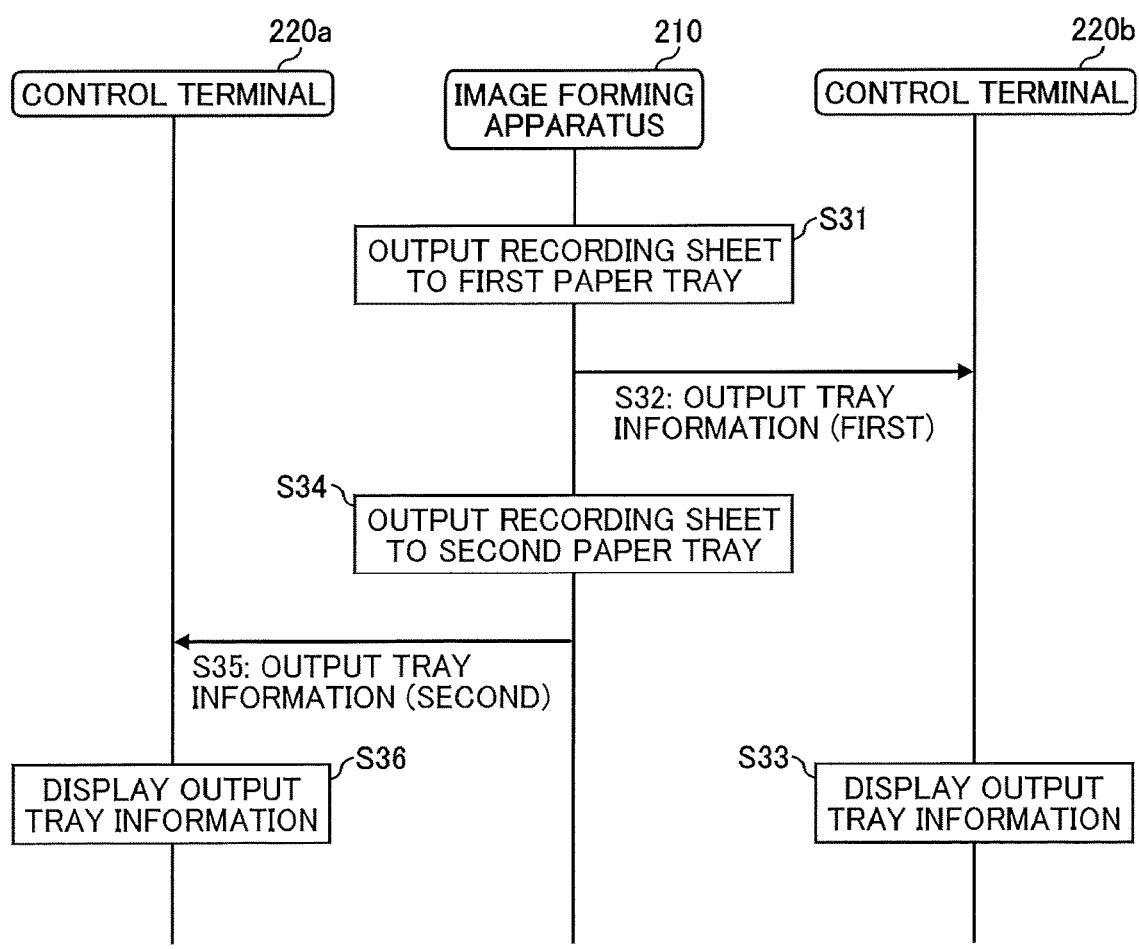
FIG. 10 is a sequence diagram illustrating operation of transmitting or receiving output location information, according to the embodiment.
Figure 11A:
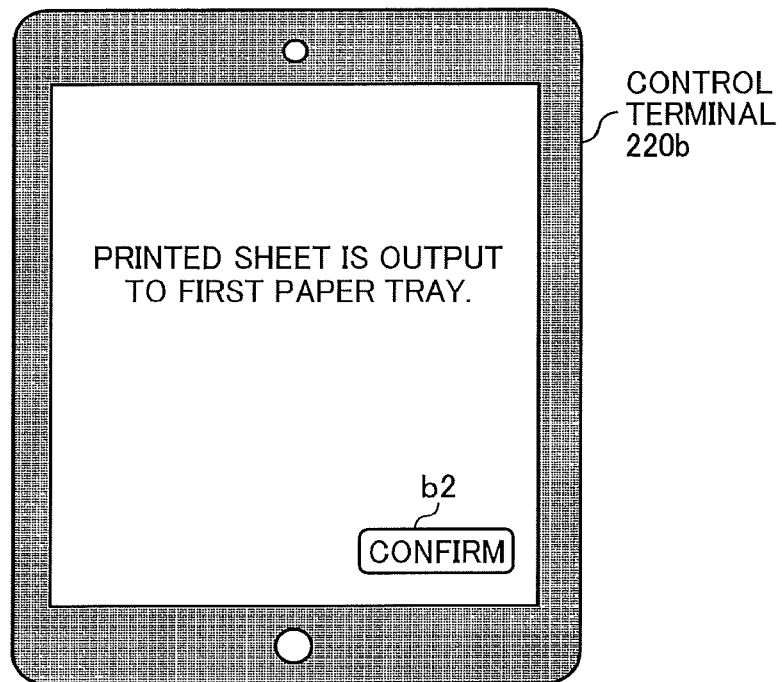
FIGS. 11A and 11B are each an illustration of an example screen with a message based on the output location information.
Figure 11B:
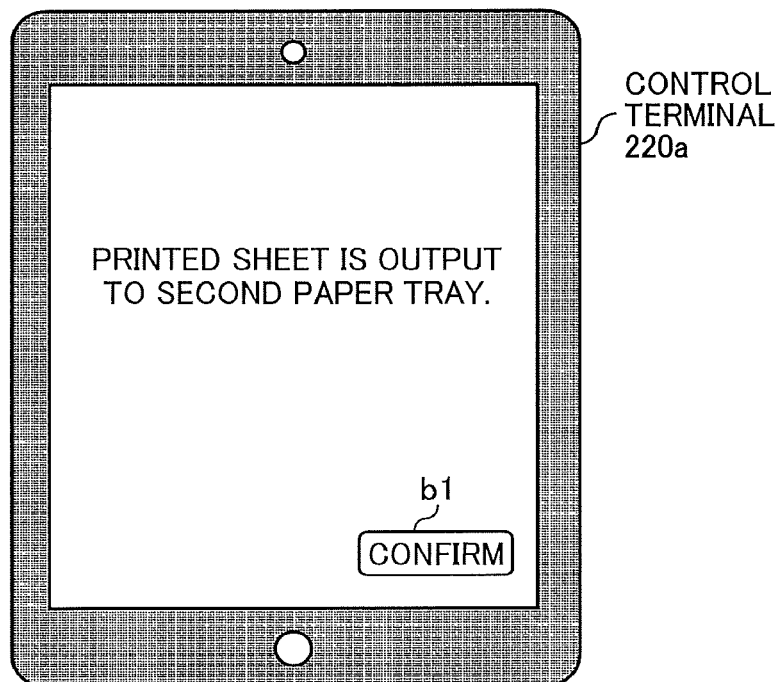

Now, referring to FIG. 10 and FIG. 11, description will be given of a case where the image forming apparatus 210 performs printing in response to reception of a plurality of process start requests received from the control terminals 220a and 220b, respectively. FIG. 10 is a data sequence diagram illustrating operation of transmitting or receiving output location information, according to the embodiment. FIG. 11A is an illustration of an example screen display at the control terminal 220b, and FIG. 11B is an illustration of an example screen displayed at the control terminal 220a.

As illustrated in FIG. 10, first, the printing unit 15b of the image forming apparatus 210 outputs, to the first paper tray 210a, a printed sheet that is printed according to a request from the control terminal 220b (S31).

Then, the communication unit 18 transmits output tray information, which is an example of output location information, to the control terminal 220b (S32). Here, it is assumed that the image forming apparatus 210 has previously obtained a destination address of the control terminal 220b, such as an IP address, together with the authentication request. The output tray information identifies a paper tray. Here, the output tray information indicates that the printed sheet is output to the first paper tray (that is, the first paper tray).

The communication unit 28 of the control terminal 220b receives the output tray information. The display control 24 of the control terminal 220b causes the displaying unit 23 to display a message based on the output tray information as illustrated in FIG. 11A (S33).

Next, the printing unit 15b of the image forming apparatus 210 outputs, to the second paper tray 210b, a printed sheet that is printed according to a request from the control terminal 220a (S34). Then, the communication unit 18 transmits output tray information, which is an example of output location information, to the control terminal 220a (S35). Here, it is assumed that the image forming apparatus 210 has previously obtained a destination address of the control terminal 220a, such as an IP address, together with the authentication request. Here, the output tray information indicates that the printed sheet is output to the second paper tray (that is, the second paper tray).

The communication unit 28 of the control terminal 220a receives the output tray information. The display control 24 of the control terminal 220a causes the displaying unit 23 to display a message based on the output tray information as illustrated in FIG. 11B (S36).

When the "CONFIRM" button b1 or b2 is pressed by the user, the display control 24 stops displaying the screen illustrated in FIGS. 11A or 11B.

As described above, according to the present embodiment, when the image forming apparatus 210 receives a plurality of requests from a plurality of users, the image forming apparatus 210 executes the plurality of requests according to the order that the process start request has received, rather than the order that authentication is completed. This reduces a time for the image forming apparatus 210 to wait for user inputs, as the image forming apparatus 210 sequentially executes the processes that are ready for being processed.

Further, the image forming apparatus 210 sends a notification about the output tray (210a or 210b) to which the printed sheet is output, to each of the control terminals 220a and 220b (S32, S35). This prevents the user from mistakenly taking out printed sheets output for another user.

In the above-described embodiment, any problem occurs when the print process or the copy in print process is being performed by the image forming apparatus 210, such as runout of paper or paper jam, the image forming apparatus 210 may change the order of processing the requested processes in the requested process management table, for example, by skipping the requested process that cannot be performed, or by performing the requested process in higher priority. This can further improve efficiency in operating the image forming apparatus 210.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, while the scan process, the print process, and the copy process are described above as examples of a first process, a second process, and a third process, respectively, any other processes executable with the image forming apparatus may be applicable as the first process, second process, and third process.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus, comprising:
   a communication interface configured to communicate with a plurality of control terminals that are operated by different users; and
   circuitry configured to
      authenticate the plurality of control terminals in an order that an authentication request is received from the control terminals;
      send an operational screen to each one of the plurality of control terminals that have been successfully authenticated for display at each control terminal, the operational screen being configured to accept a process request for requesting the image forming apparatus to execute an image forming process;
      receive a plurality of process requests from the plurality of control terminals that have been authenticated in an order that the process request is accepted at the control terminals; and
      control an image forming device to execute a plurality of image forming processes according to the plurality of process requests in the order that the process request is accepted at the control terminals, wherein the image forming apparatus further includes
   the image forming device including reading circuitry to execute a scan process, and printing circuitry to execute a print process, the reading circuitry and the printing circuitry being configured to operate independently from each other,
   wherein, when a process request for executing the print process and a process request for executing the scan process are received at substantially a same time, the circuitry is further configured to control the reading circuitry to execute the scan process, and control the printing circuitry to execute the print process, concurrently.

2. The image forming apparatus of claim 1, wherein the order that the authentication request is received from the control terminals can differ from the order that the process request is accepted at the control terminals.

3. The image forming apparatus of claim 1, further comprising:
   a plurality of output trays onto which one or more printed sheets are output,
   wherein when the plurality of process requests includes at least two process requests each causing output of printed sheets onto one of the plurality of output trays, the circuitry is further configured to control the communication interface to transmit output location information to each one of the control terminals that has transmitted each one of the at least two process requests for display, the output location information indicating one of the plurality of output trays onto which one or more printed sheets are output according to the process request received from the control terminal that has transmitted the process request.

4. An image forming system, comprising:
   the image forming apparatus of claim 1; and
   the plurality of control terminals communicably connected with the image forming apparatus, each control terminal comprising:
   a local communication interface configured to transmit the process request to the image forming apparatus in response to acceptance of the process request by the operational screen, such that the plurality of process requests are transmitted to the image forming apparatus in the order that the process request is accepted at the control terminal.

5. The image forming system of claim 4,
   wherein the image forming apparatus includes a plurality of output trays onto which one or more printed sheets are output,
   wherein when the plurality of process requests includes at least two process requests each causing output of printed sheets onto one of the plurality of output trays, the circuitry of the image forming apparatus is further configured to control the communication interface to transmit output location information to each one of the control terminals that has transmitted each one of the at least two process requests for display, the output location information indicating one of the plurality of output trays onto which one or more printed sheets are output according to the process request received from the control terminal that has transmitted the process request, and
   wherein the control terminal is further configured to display a message based on the output location information received from the image forming apparatus.

6. An image forming apparatus comprising:
   a communication interface configured to communicate with a plurality of control terminals that are operated by different users;
   circuitry configured to
      authenticate the plurality of control terminals in an order that an authentication request is received from the control terminals;
      send an operational screen to each one of the plurality of control terminals that have been successfully authenticated for display at each control terminal, the operational screen being configured to accept a process request for requesting the image forming apparatus to execute an image forming process:
      receive a plurality of process requests from the plurality of control terminals that have been authenticated in an order that the process request is accepted at the control terminals; and
      control an image forming device to execute a plurality of image forming processes according to the plurality of process requests in the order that the process request is accepted at the control terminals; and
   the image forming device including reading circuitry to execute a scan process, and printing circuitry to execute a print process, the reading circuitry and the printing circuitry being configured to operate independently from each other, wherein when a process request for executing a copy process, which is a combination of a copy scan process and a copy print process, and a process request for executing a scan process are received at substantially a same time, the circuitry is further configured to determine whether the reading circuitry is executing a current scan process, and based on a determination that the reading circuitry is executing the current scan process, the circuitry is further configured to control the reading circuitry to execute the copy scan process in the copy process, after completion of executing the current scan process.

7. An image forming apparatus comprising:
a communication interface configured to communicate with a plurality of control terminals that are operated by different users;
circuitry configured to
   authenticate the plurality of control terminals in an order that an authentication request is received from the control terminals;
   send an operational screen to each one of the plurality of control terminals that have been successfully authenticated for display at each control terminal, the operational screen being configured to accept a process request for requesting the image forming apparatus to execute an image forming process;
   receive a plurality of process requests from the plurality of control terminals that have been authenticated in an order that the process request is accepted at the control terminals; and
   control an image forming device to execute a plurality of image forming processes according to the plurality of process requests in the order that the process request is accepted at the control terminals; and
the image forming device including reading circuitry to execute a scan process, and printing circuitry to execute a print process, the reading circuitry and the printing circuitry being configured to operate independently from each other,
wherein when the process request for executing a copy process, which is a combination of a copy scan process and a copy print process, and a process request for executing a print process are received at substantially a same time, the circuitry is further configured to determine whether the printing circuitry is executing a current print process, and based on a determination that the printing circuitry is executing the current print process, the circuitry is further configured to control the reading circuitry to execute the copy scan process in the copy process, and control the printing circuitry to execute the copy print process in the copy process, after completion of executing the copy scan process in the copy process.

8. An image forming method, comprising:
authenticating a plurality of control terminals that are operated by different users, in an order that an authentication request is received from the control terminals;
sending an operational screen to each one of the plurality of control terminals that have been successfully authenticated for display at each control terminal, the operational screen being configured to accept a process request for requesting an image forming apparatus to execute an image forming process;
receiving a plurality of process requests from the plurality of control terminals that have been authenticated in an order that the process request is accepted at the control terminals: and
controlling an image forming device to execute a plurality of image forming processes according to the plurality of process requests in the order that the process request is accepted at the control terminals, wherein
the image forming device includes reading circuitry to execute a scan process, and printing circuitry to execute a print process, the reading circuitry and the printing circuitry being configured to operate independently from each other, and
when a process request for executing the print process and a process request for executing the scan process are received at substantially a same time, the controlling step includes controlling the reading circuitry to execute the scan process, and controlling the printing circuitry to execute the print process, concurrently.

9. A non-transitory recording medium which, when executed by one or more processors, cause the processors to perform an image forming method comprising:
authenticating a plurality of control terminals that are operated by different users, in an order that an authentication request is received from the control terminals;
sending an operational screen to each one of the plurality of control terminals that have been successfully authenticated for display at each control terminal, the operational screen being configured to accept a process request for requesting the image forming apparatus to execute an image forming process;
receiving a plurality of process requests from the plurality of control terminals that have been authenticated in an order that the process request is accepted at the control terminals; and
controlling an image forming device to execute a plurality of image forming processes according to the plurality of process requests in the order that the process request is accepted at the control terminals, wherein
the image forming device includes reading circuitry to execute a scan process, and printing circuitry to execute a print process, the reading circuitry and the printing circuitry being configured to operate independently from each other, and
when a process request for executing the print process and a process request for executing the scan process are received at substantially a same time, the controlling step includes controlling the reading circuitry to execute the scan process, and controlling the printing circuitry to execute the print process, concurrently.

* * * * *